United States Patent [19]

Fuecker et al.

[11] Patent Number: 5,775,192
[45] Date of Patent: Jul. 7, 1998

[54] SLIDING MITER CUTTER

[75] Inventors: Willard N. Fuecker, 520 Raymond Ave. NE., St. Could, Minn. 56304; Peter S. Theisen; John A. Theisen, both of St. Cloud, Minn.

[73] Assignee: Willard N. Fuecker, St. Cloud, Minn.

[21] Appl. No.: 619,035

[22] Filed: Mar. 20, 1996

[51] Int. Cl.$^6$ ........................................ B26D 1/30
[52] U.S. Cl. ........................ 83/597; 83/468.3; 83/581; 83/608
[58] Field of Search ................... 30/233, 250, 252, 30/253, 258; 83/468.3, 468.7, 581, 641, 694, 607, 608, 597

[56] References Cited

U.S. PATENT DOCUMENTS

| | | | |
|---|---|---|---|
| 3,134,285 | 5/1964 | Greene | 83/468.3 |
| 3,455,197 | 7/1969 | Richardson | 83/468.3 |
| 4,510,834 | 4/1985 | Greene et al. | 83/468.1 |
| 4,567,802 | 2/1986 | Witherspoon | 83/607 |
| 4,771,669 | 9/1988 | Bianchi | 83/468.7 |

FOREIGN PATENT DOCUMENTS

94/26483  11/1994  WIPO ........................... 83/581

*Primary Examiner*—Maurina T. Rachuba
*Attorney, Agent, or Firm*—Albert W. Watkins

[57] ABSTRACT

A shear type miter cutter has a pivotal blade and four linearly sliding blades. The linearly sliding blades may be manually linearly positioned to preset locations for a particular size or type of stock material. The linearly sliding blades are further linearly adjusted automatically upon rotation of a stock material support fence, to ensure optimum alignment between the pivotal blade and the linearly sliding blades. The automatic adjustment allows an operator to make rapid changes in cut angles for a given stock material, while still yielding finished cut edges of high quality and precise angular orientation. A variety of designs for rapidly manually setting the cutter to specific preset angles and specific stock materials are also disclosed.

15 Claims, 6 Drawing Sheets

SLIDING MITER CUTTER

BACKGROUND OF THE INVENTION

1. Field of the Invention

The present invention pertains to cutters generally, and particularly to shearing type cutters as might be used, for example, to cut building construction siding.

2. Description of the Related Art

In the building construction industry, many new and diverse technologies come together to provide builders with better materials and construction techniques. Advanced materials for siding, such as aluminum, steel and vinyl, provide both builders and building owners advantages. However, tools have not yet been fully developed that allow builders to take full advantage of these materials.

For example, aluminum, steel and vinyl siding and trim are available in large sheets, strips or continuous rolls which must be cut to the particular shape of the building frame. These strips are usually quite thin, and so are readily cut by shears, much like scissors are used to cut paper. In fact, a typical siding cutter used in the field resembles a paper cutter. However, siding is not as flexible as paper and so both sides of the cut must be sheared, leaving two finished surfaces with a small kerf sheared from the finished edges.

Steel siding is particularly challenging, owing to the galvanized zinc coating that provides corrosion protection. Cutting with a saw may remove the soft zinc, leaving exposed steel surfaces. As is well known, such exposed surfaces will corrode very quickly. In fact, the use of a saw may void the siding manufacturer's warranty. Steel siding may, however, be cut with a shearing action. When cut this way, the softer zinc is smeared over the sheared steel edge, providing necessary protection against the environment.

As noted above, these strips or rolls of stock material are cut using devices that resemble office paper cutters, with a pivoting blade which coacts with two stationary cutters to shear the material. These devices work admirably when making cuts perpendicular to the stock material. The cut is made very quickly and with very clean and precise finished edges. For the purposes of this disclosure the resulting edges are referred to as finished when no further work is required to install the material into the construction.

However, cuts made at angles different from perpendicular are extremely difficult and time consuming to make in the field during construction. As a result, the expense of applying these advanced building materials increases significantly when custom work or retrofitting is required. Generally, an installer will use a cutting shear to make the necessary perpendicular cuts. When a cut other than perpendicular is required, the strip may be sheared perpendicularly to the approximate size and then angled with hand shears. Unfortunately, hand shears leave an unfinished edge that is distorted, rough, and jagged, making the stock material hazardous to handle and difficult to install smoothly against a flat surface.

Figure 5:
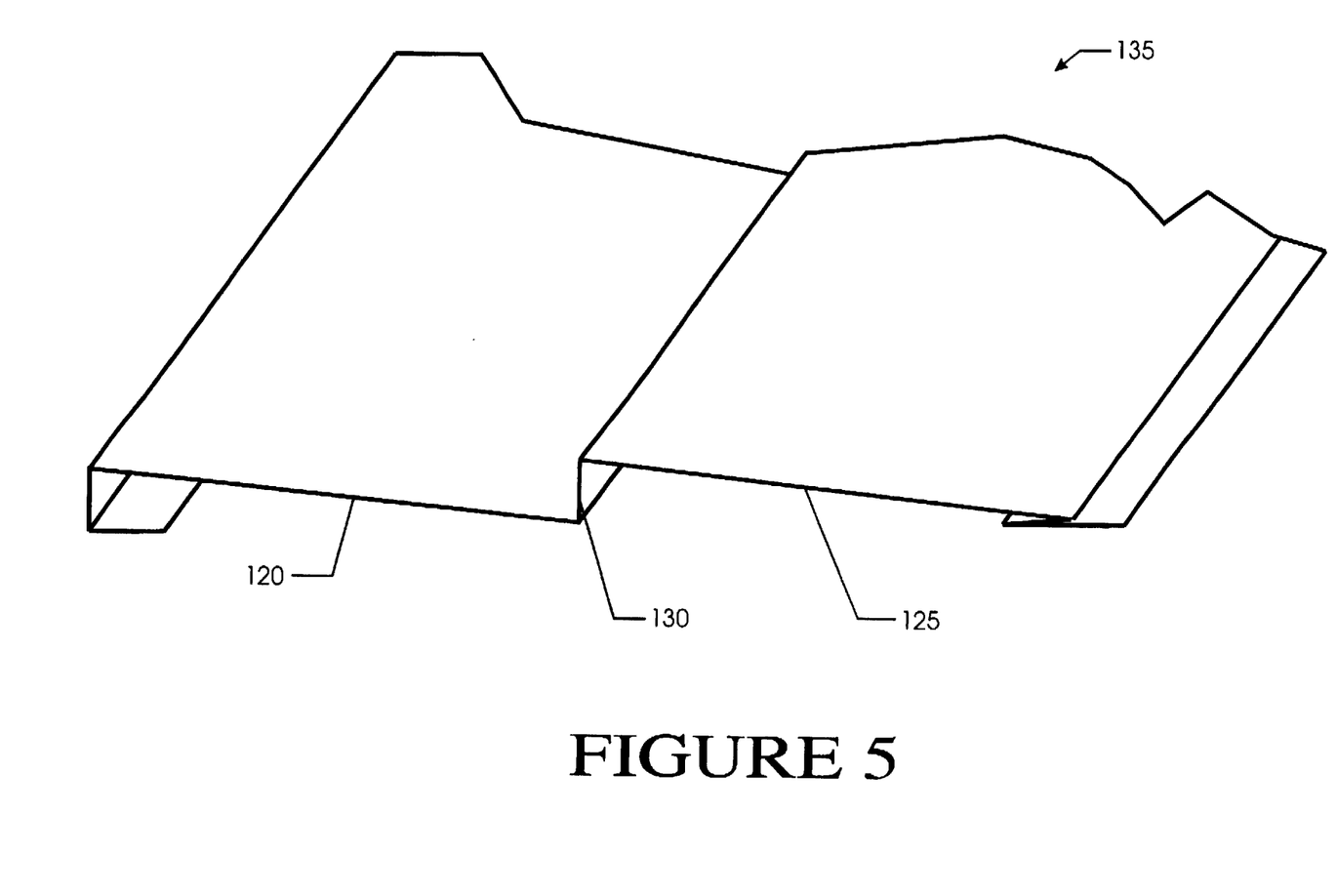
FIG. 5 illustrates a siding strip which might be cut by the present invention.

Additionally, hand shears are much slower to use to cut siding. The builder will have to pencil an angle onto the material to mark the intended cut. Next, hand shears must be worked through the stock material. In the case of lap siding such as double four or double five, where there are two or more parallel but offset surfaces separated by a small edge, as shown for example in the present application as FIG. 5, the builder must shear each flat 120 and 125 first, and then bend the siding at the cut to allow access to the small edge 130 before the cut may be completed. The entire process, even in the case of an experienced installer, may typically require seven minutes of work.

Examples of prior art siding cutters are found in U.S. Pat. Nos. 5,251,524 to Clifford; 4,510,834 to Greene et al.; 3,134,285 to Greene; 3,362,070 to Huggins; 2,355,320 to Nebel; 3,714,856 to Hall et al.; 5,010,795 to Kania; and 5,038,477 to Parrow; all incorporated herein by reference. In these prior art siding cutters, as in the present invention, a cutter blade is used to pivotally shear between two spaced apart stationary blades. Commonly in the prior art and in industry, as shown, for example in FIG. 3 of Greene '285, the entire cutter structure is rotated relative to the siding. Pegs, pins, bolts, nails or other projections are used to align the siding to the cutter. While this method is acceptable when a number of cuts are to be made at a fixed angle, this is often disadvantageous in the building industry, where, for example, siding is most desirably applied alternately from both edges to a final central region. In order to accomplish these angles which alternate from one direction to another, the prior art cutters must be moved and aligned, making this method so time consuming as to be cost prohibitive. As noted hereinabove, persons in the trade find cutting the materials with hand shears and then cleaning up the unfinished edges an easier task than frequently re-aligning the siding cutter.

Another problem encountered in the industry when using a stationary siding cutter to cut angles occurs when the stock material has not been precut to a precise predetermined length. In these instances, the siding extends beyond the cutter at an angle to the stationary blades. The siding may only be placed so that the siding edge mates perfectly with one stationary cutter, but not with both stationary cutters. Therefore, the pivoting cutter blade first contacts the siding with only one stationary cutter opposing the pivoting cutter. The siding may then deform, since there is no counter force on the second edge to ensure a shearing action. When this happens, stock material may be wasted since the resulting edge will no longer be finished and the stock material may be permanently creased or deformed.

In order to overcome these difficulties previously encountered in the field, others have designed fully rotating cutter structures, such as shown, for example, in Greene et al. '834. While the '834 patent offers a number of advantages over the prior art in handling miter cuts, the cutter becomes prohibitively large and difficult to handle. The bed 10 illustrated therein must be strong enough to support the rotatable shear throughout all cutting angles and not flex or deform during the cutting stroke. As a result, the bed becomes the single largest piece of the machine. In addition, the machine operator must move the entire cutter assembly to each desired angle. As is immediately apparent, the cutter structure is at best cumbersome.

SUMMARY OF THE INVENTION

The present invention overcomes the limitations of the prior art by providing a compact shearing type cutter structure wherein the pivotal cutter blade coacts with self-adjusting, linearly sliding opposing blades. During a perpendicular cutting stroke, these cutter blades operate the same as the prior art perpendicular pivotal shearing cutters. A fence is provided to assist in placing the stock material relative to the cutter blades, and adjustments are provided to align these first linearly sliding blades to the size and spacing of the materials. A second set of linearly sliding blades is supported directly upon the first blades and is linearly slidable with respect to the first set. The second set of linearly slidable blades cooperates with the first set to form a step, where non-flat stock materials such as stepped siding are to be sheared. The second set of blades is removable or adjustable for each particular type of stock material.

The fence is rotatable, and cooperates with a novel drive mechanism while being pivoted. The drive mechanism directly slides the linearly slidable blades that are on opposite sides of the cutting gap oppositely of each other. When the fence is pivoted, the otherwise stationary blades are automatically adjusted to the new cutting angle. The drive mechanism includes an initial adjustment to properly align the blades for a perpendicular cut, after which no further adjustment is required. The fence may be positioned repetitively to preset angles through the use of a novel stop.

OBJECTS OF THE INVENTION

An object of the present invention is to provide a shear type cutter which is continuously variable to perform miter cuts of any desired angle.

Another object of the present invention is to provide a shear type cutter which is of small size relative to the stock material, and which is readily handled by a cutter operator.

Another object of the present invention is to provide a shear type miter cutter which may be operated without any special training required for the operator prior to cutting.

Another object of the present invention is to provide a shear type miter cutter which requires no adjustment between miter cuts of different angles other than movement of the fence.

BRIEF DESCRIPTION OF THE DRAWINGS

These and other objects and features of the invention will be apparent from the following description of preferred embodiments with reference to the accompanying drawings, in which.

For sake of brevity and clarity, like components and elements will bear the same designations throughout the figures.

DESCRIPTION OF THE PREFERRED EMBODIMENT

The preferred embodiment of the present invention is illustrated in FIGS. 1–4 and 6. Therein, a sliding miter cutter 10 having the preferred features of the present invention is illustrated generally, having a cutter base 20, a fence 14 and a blade 16. Extending from base 20 is a table mounting plate 18 which may be used to attach cutter 10 to a table, saw horse or other structure. Table mounting plate 18 therefore eliminates any requirement for flat work areas, which may be difficult to find at typical construction sites. Table mounting plate 18 forms a main structural support for the remaining components of cutter 10.

Figure 3:
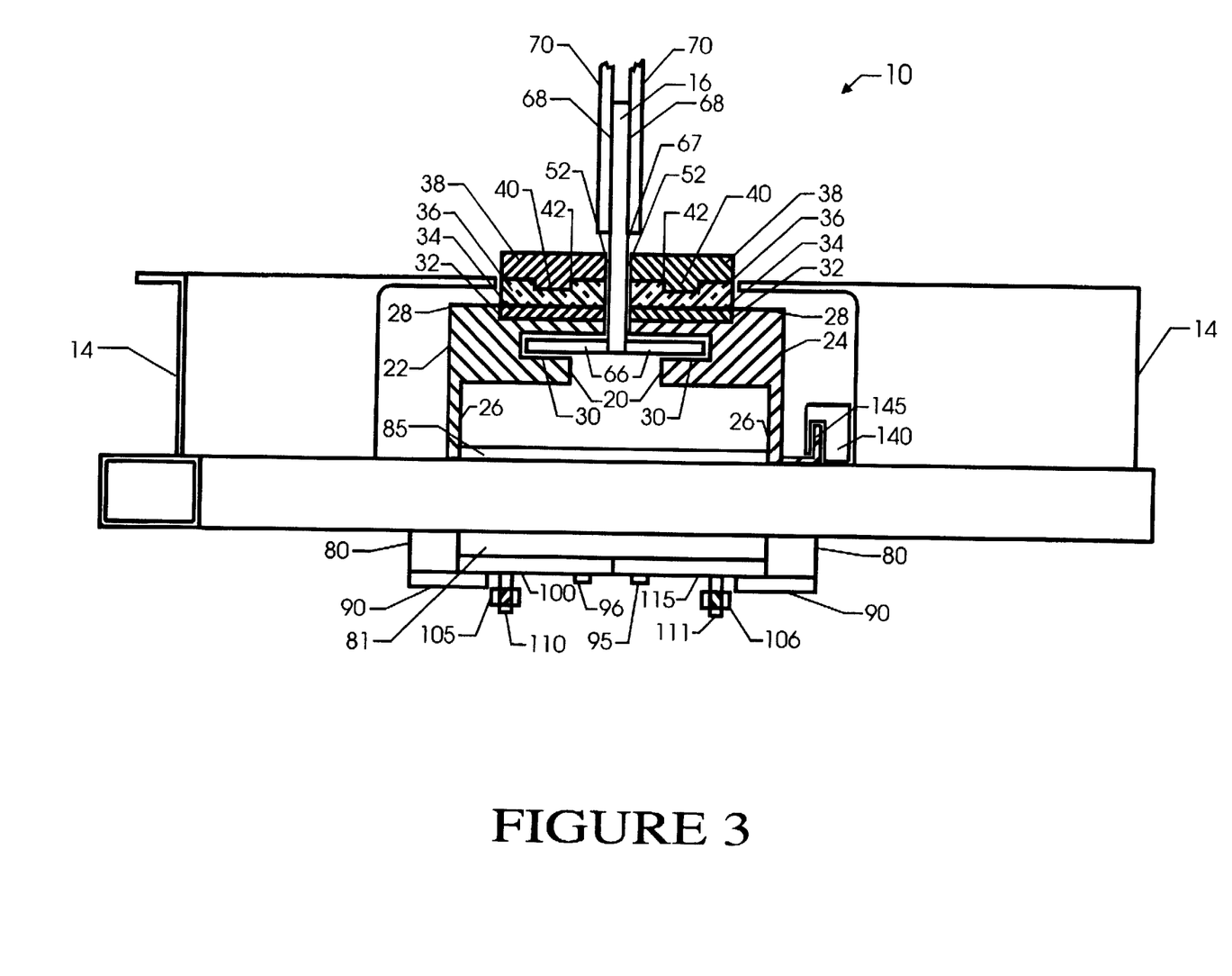
FIG. 3 illustrates a cross-section of the preferred embodiment of FIG. 1 taken along section line 3 of FIG. 2.

FIG. 3 illustrates details of cutter base 20 most clearly. Therein, cutter base 20 includes left linear cutter support 22 and right linear cutter support 24, which are mirror images of each other. While in cross-section these cutter supports 22 and 24 are shown as comprising two separate components and maybe so formed, in the preferred embodiment it is emphasized that these are formed as integral components of cutter base 20. Each cutter support 22 and 24 comprises an elevation support 26 and a top surface 28. The top surface 28 has a notch 30 formed therein. Notch 30 is rectangular and extends the length of cutter base 20.

The top of each cutter support 22 and 24 has a channel 32 formed above and separated from notch 30. Rail 34, only visible in cross-section FIG. 3, may be automatically adjusted longitudinally within channel 32, as will be explained in greater detail hereinafter. Bottom blade 36 is supported and adjustable longitudinally on rail 34, and top blade 38 is supported and longitudinally adjustable on blade 36. Rib 40 of top blade 38 fits in groove 42 formed on the top side of bottom blade 36 to ensure longitudinal alignment therebetween.

Referring back to FIG. 1, a number of threaded fixture holes 44 are located at predetermined intervals in groove 42. Adjustment slots 46 in top blade 38 extend vertically through top blade 38 to allow top blade 38 to be adjusted longitudinally relative to bottom blade 36, and then anchored in place securely with set screws 48. This, in operation, will typically be a one-time adjustment, wherein the blades may be set one relative to the other for particular sizes of siding. To adjust for different types of siding, such as double four (D4) or double five (D5) siding, the bottom blade 36 and top blade 38 must be appropriately aligned to mesh with the siding. D4 siding has two flats 120 and 125 shown in FIG. 5 which are each four inches in length. In the case of D5 siding, the two flats 120 and 125 are each five inches in length. By providing blades 36 and 38 with longitudinal adjustment relative to each other, each different type of siding may be accommodated. Furthermore, when only one cutter is required for the siding to be cut, set screws 48 may be removed completely and top blade 38 may be removed.

As is apparent, the adjustment, or removal, of top blade 38 relative to bottom blade 36 is a one-time adjustment made in the field. The adjustment is determined by the type of siding being installed, and no further adjustment will be required until a different type of siding is to be cut. Furthermore, while a set screw has been described for element 48, one of ordinary skill will identify any number of well-known suitable alternatives, the main requirement being the adjustment or removal of top blade 38 relative to or from bottom blade 36. Where desired, guide marks or mating ridges and protrusions may be provided between top blade 38 and bottom blade 36 to quickly select standard siding dimensions.

Figure 6:
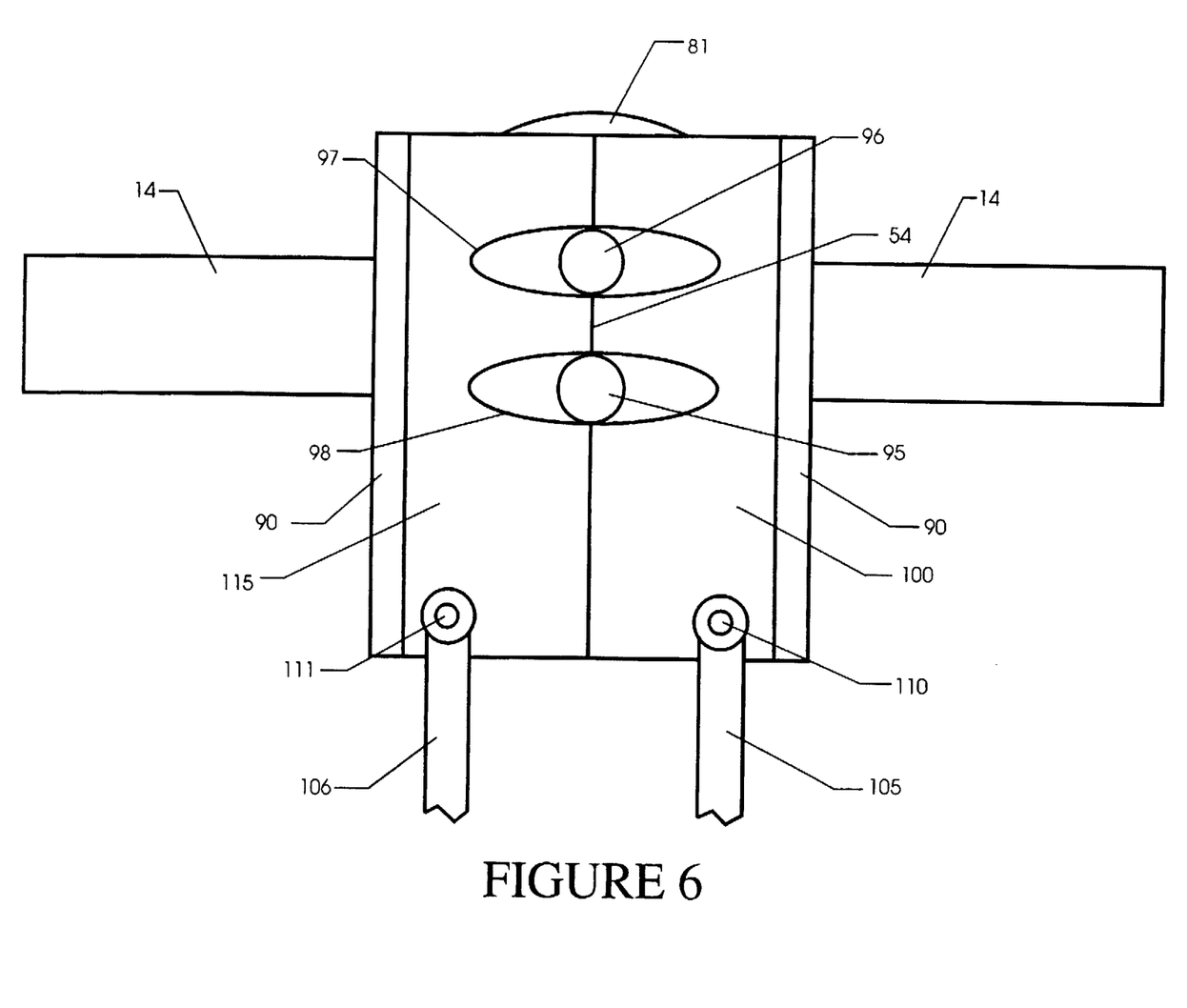
FIG. 6 illustrates a bottom perspective view of the preferred embodiment drive mechanism of the present invention.

Referring most particularly to FIGS. 3 and 6, cutter supports 22 and 24 are spaced from each other to form a gap 52 through which cutter blade 16 travels. Siding fence 14 rotates relative to base 20 about pivot point 54. Siding fence 14 is carried upon and rigidly affixed to generally round disk 81 and is rotatably mounted between top fence support plate 85 and drive plates 100, 115. Drive plates 100, 115 are retained vertically by bottom fence support plates 90, laterally by outer rails 80, and longitudinally by guide pins 95, 96.

In operation of sliding miter cutter 10, an operator will select an appropriate angle for the siding to be cut at by rotating fence 14 about pivot point 54. As the operator rotates fence 14, generally round disk 81 rotates, causing guide pins 95 and 96 to move within slots 97 and 98. In turn, guide pins 95 and 96 force relative longitudinal motion between drive plates 100 and 115. For example, as viewed in FIG. 6, when generally round disk 81 and fence 14 are rotated counterclockwise, guide pins 95 and 96 also will rotate counterclockwise. Since pin 96 moves to the left of center and thereby only engages with drive plate 115, drive plate 115 is moved downward by pin 96. Simultaneously, pin 95 is moved to the right of center, thereby only engaging drive plate 100. Since the rotation of pin 95 is counterclockwise about pivot point 54, drive plate 100 is moved upward by pin 95. One will observe that drive plate 115 is moving longitudinally in one direction, while drive plate 100 moves longitudinally opposite.

When fence 14 is transverse or perpendicular to the longitudinal axis of blade 16, rotation is accompanied by very little longitudinal motion between drive plates 100 and 115. In this instance, guide pins 95 and 96 primarily slide left and right within slots 97 and 98. However, when fence 14 is nearly parallel to the longitudinal axis of blade 16, guide pins 95 and 96 are sliding perpendicular to slots 97 and 98, thereby causing a maximum amount of longitudinal motion between drive plates 100 and 115. If one plotted the relative displacement between drive plates 100 and 115 versus the angular position of fence 14 relative to the longitudinal axis of the cutter blade 16, a sine wave function would be plotted. While a sine wave is generated by the preferred embodiment, other similar nonlinear functions may also be designed and generated in accord with the present invention.

This nonlinear function of displacement relative to angle of rotation is very important. Nonlinear displacement of cutter blades 36 and 38 maintains tracking with the rotation of fence 14, to provide a bottom blade 36 immediately at the start of any miter cut to counteract any shearing forces applied by cutter blade 16. As aforementioned, stationary cutter blades of the prior art do not engage with the pivoting cutter blade on both sides of the gap when any angle other than perpendicular cuts is selected. The prior art lack of counter force blades can result in bending and deformation of the stock siding material, resulting in large waste of valuable siding material and time.

The relative longitudinal motion of drive plates 100 and 115 causes motion to be transmitted from drive plates 100 and 115 through bolts 110 and 111 to tie rods 105 and 106. Tie rods 105 and 106 are connected through side plates 114 to rails 34 and bottom blades 36.

Tie rods 105 and 106 in the preferred embodiment are fixed in length and so are not adjustable. However, as an alternative it is contemplated that tie rods 105 and 106 could be adjustable in length to allow alignments which might be desired after the time of manufacture.

Figure 2:
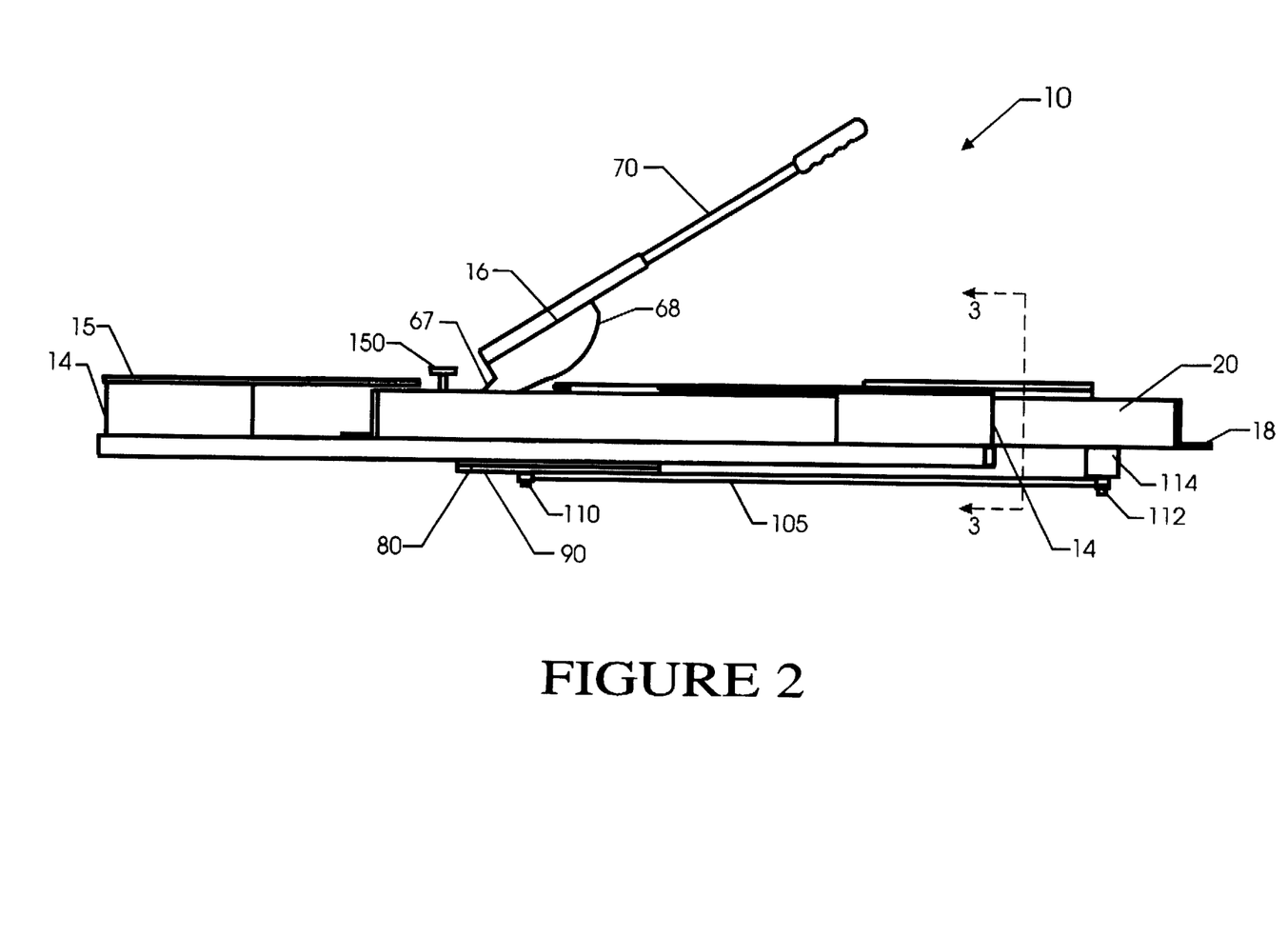
FIG. 2 illustrates a side perspective of the preferred embodiment of the invention showing the blade raised prior to making a cut.

As can be seen best in FIG. 2, fence 14 will rotate and thereby cause longitudinal motion to be transmitted through tie rod 105 to bolt 112 and side plate 114 and up to rail 32 and cutter 34. Side plate 114 may traverse through cutter base 20 at slots 35 and 37 which are cut vertically through cutter base 20. Side plate 114 is fixedly attached to rail 34.

A small locking slide 140 shown in FIG. 3 may be affixed to fence 14 so as to slide upon rail 145. Locking slide 140 may have a set screw or other fastener to attach directly to rail 145, to retain fence 14 in a specified position. Alternatively, an operator may attach small clamps such as C-clamps or other similar devices to rail 145 at two predetermined positions, to allow rapid switching to the corresponding preset angles by merely rotating fence 14 until slide 140 engages the clamps.

Figure 4:
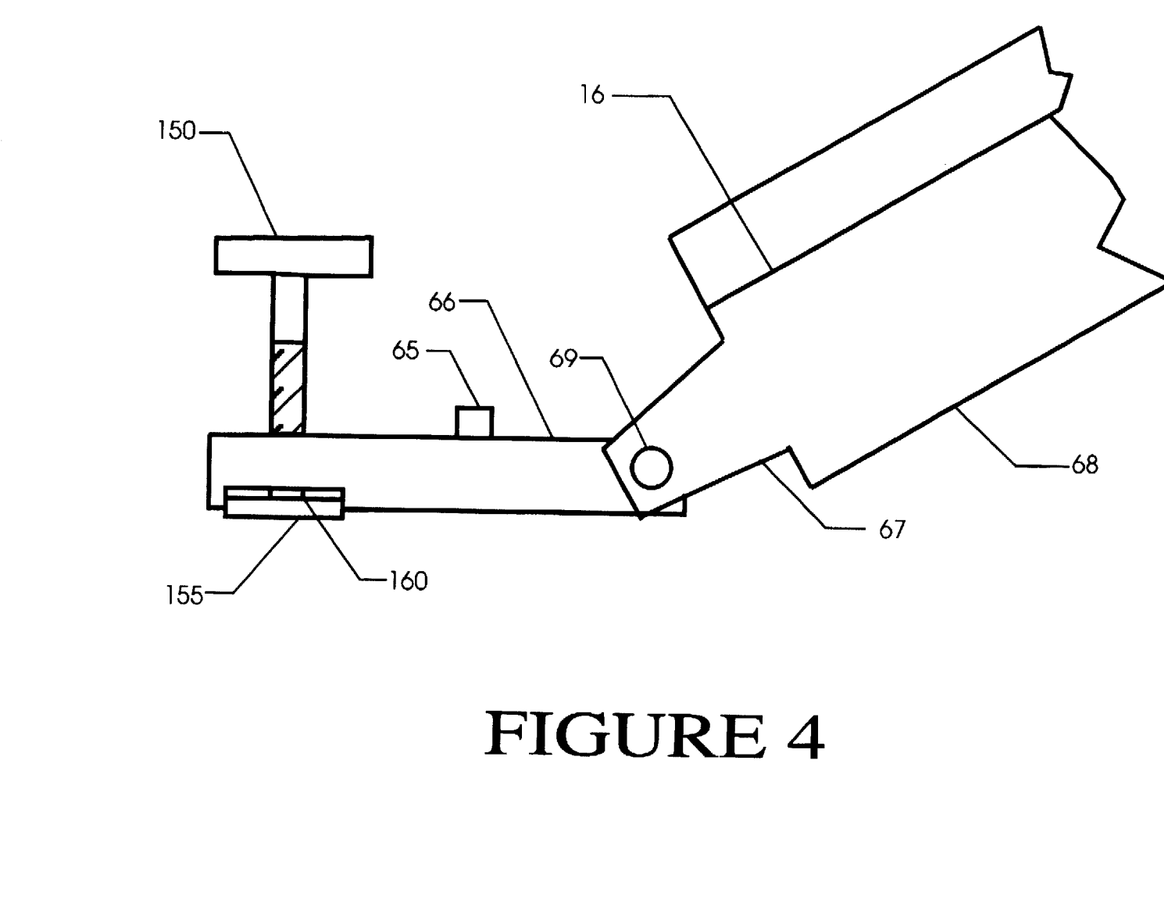
FIG. 4 illustrates a preferred embodiment of the cutter blade slide mechanism.

In FIG. 4, the slide mechanism 66 and blade 16 are shown in magnified view. Therein, blade 16 is attached on an extension 67 to slide 66 through linkage 69. Extension 67 may be welded, bolted, attached with other suitable fastening means or even may be formed integrally with blade 16. Extension 67 is preferably pinned to form a rotary joint with slide 66, though any reasonable pivotal interconnection is acceptable. Stop 65 engages with blade 16 when blade 16 is rotated approximately perpendicular to slide 66, to maintain handle 70 in a roughly vertical direction. An operator may move the handle 70 until blade 16 engages stop 65, retaining handle 70 in the air.

To set up the cutter 10 for operation, bottom blades 36 and top blades 38 are set for the type of siding which is being cut. Next, stock material such as siding 135 is placed onto blades 36 and 38. Next, the operator will adjust slide 66 so that blade 16 will engage the stock material at a suitable cutting angle. Next, slide locking knob 150 is rotated to clamp slide 66 into place relative to notch 30. Then the operator may begin cutting by moving handle 70 to cause blade 16 and bottom blade 36 to engage siding 135.

Slide locking knob 150 is preferably threaded into slide 66. Rotation of slide locking knob 150 results in movement of slide locking plate 155, either into planar alignment with slide 66 or out of alignment, depending upon the direction of rotation. When slide locking plate 155 is moved out of alignment with slide 66, the enlarged combined vertical height of slide 66 and slide locking plate 155 causes slide 66 to be lifted within notch 30 to frictionally engage the upper surface thereof. The friction forces are great enough to ensure that the shear begins without further movement of slide 66 within notch 30.

Some type of rotary to linear conversion must be provided to convert the rotation of slide locking knob 150 into linear motion of slide locking plate 150. In the preferred embodiment, one or more rivets 160 may be provided. Rivets 160 serve to loosely retain slide locking plate 160 with slide 66, while allowing limited motion therebetween. When slide locking knob 150 is rotated in a first direction, the threading thereon forces knob 150 through slide 66 and against slide locking plate 155, thereby forcing slide locking plate 155 out of alignment with slide 66. This results in locking of slide 66 within notch 30. When slide locking knob 150 is rotated in a second direction opposite to the first direction, slide locking knob 150 is pulled by the threading thereon away from slide locking plate 155. This results in slide locking plate 155 being freed up to move into alignment with slide 66, thereby freeing slide 66 to slide within notch 30.

Alternatively, slide locking knob 150 may be narrowed at the end adjacent slide locking plate 155, then passed through an unthreaded hole within slide locking plate 155, and then deformed therein, so as to allow rotation of slide locking knob 150 relative to slide locking plate 155 without any other changes therebetween. As is apparent, in light of the present disclosure a number of other suitable alternatives will be suitable to form this rotary to linear interconnection.

While slide locking knob 150 and slide locking plate 155 are illustrated in the preferred embodiment, it will be clearly understood by one of ordinary skill that other alternatives may be suitable for positioning blade 16. One alternative is a purely frictional engagement whereby neither slide locking knob 150 nor slide locking plate 155 are provided, leaving the shearing force upon blade 16 pressing against siding 135 to cause slide 66 to lift within notch 30 and thereby frictionally engage notch 30.

Figure 1:
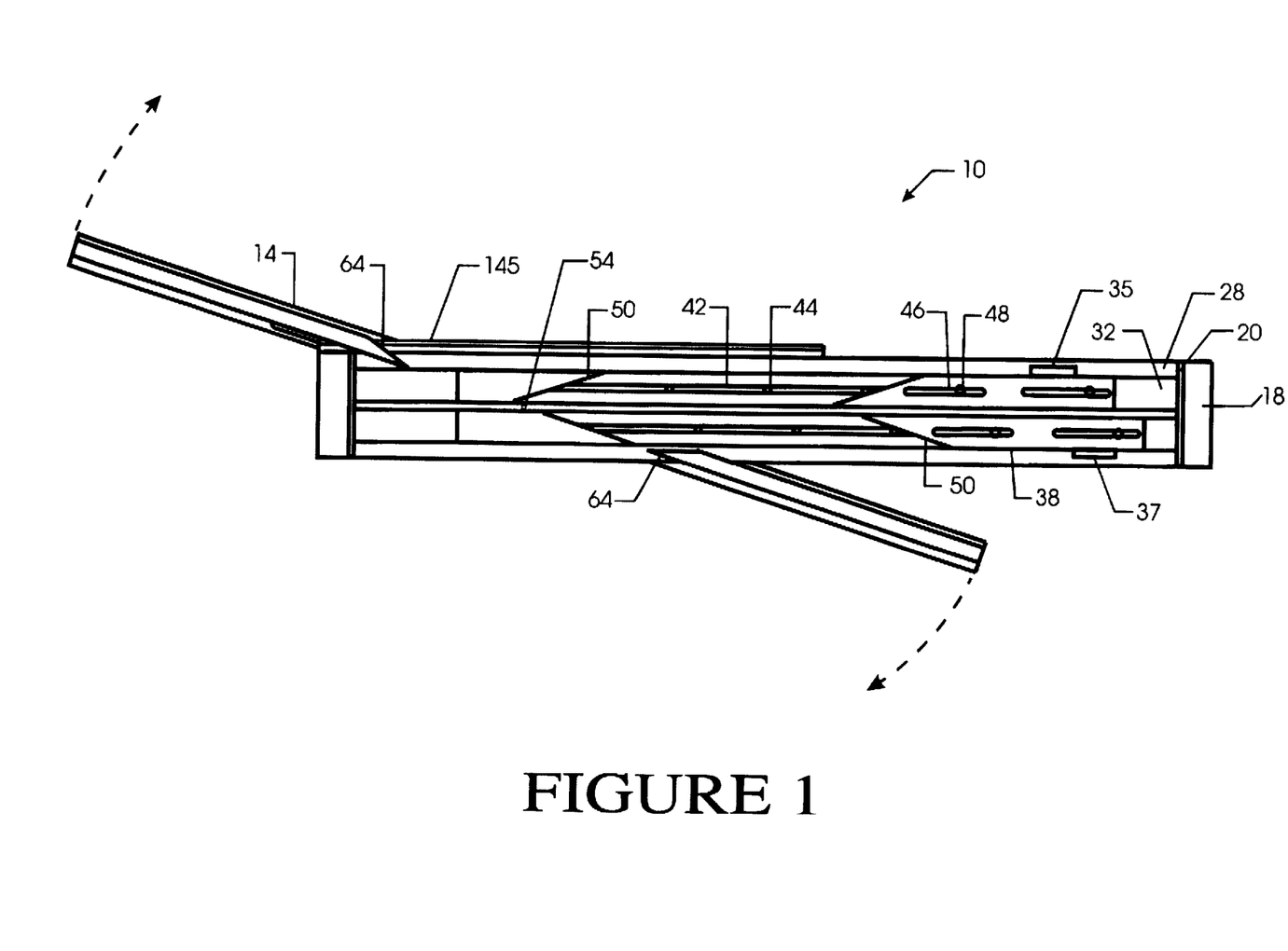
FIG. 1 illustrates a top perspective of the preferred embodiment of the invention showing the blade removed.

As illustrated in FIG. 1, blades 36 and 38 have angularly tapered ends 49 and 50, respectively. These ends are tapered to accommodate the greatest angle from perpendicular that the cutter may be operated at. This is so the surfaces of blades 36 and 38 opposite blade gap 52 do not interfere with placement of the siding at these greatest angles. Obviously, no angle whatsoever would be required if only perpendicular cuts were to be required. However, if cuts down to 10 degrees from the longitudinal axis are required, then ends 49 and 50 should be tapered at that same 10 degrees from longitudinal. Similarly, fence 14 has angular cutouts 64 which are provided to prevent fence 14 from colliding with either cutter base 20 or blades 36 and 38 when fence 14 is rotated to the aforementioned greatest cut angle.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims hereinbelow.

We claim:

1. A sliding miter cutter for shearing a stock material comprising:

a first cutter blade, said first cutter blade operatively engaging with a second cutter blade and a third cutter blade to shear said stock material along two spaced, parallel cut lines;

a frame upon which said first, second and third cutter blades are supported:

a fence which supports said stock material, said fence supported upon said frame and rotatable relative to said first cutter blade, said stock material rotating relative to said first blade upon a rotation of said fence relative to said first blade; and an automatic blade aligner for moving said second cutter blade and said third cutter blade relative to said first cutter blade responsive to a rotation of said rotatable fence each by an amount necessary to maintain said second and said third cutter blades engaged with said first cutter blade throughout said shearing, whereby said stock material is finished on both of said parallel cut lines.

2. The sliding miter cutter of claim 1 wherein said automatic blade aligner moves said third cutter blade relative to said first cutter blade.

3. The sliding miter cutter of claim 2 wherein said third cutter blade is moved an equal amount in a direction opposite to said movement of said second cutter blade.

4. The sliding miter cutter of claim 1 further comprising a fence rotation stop.

5. A miter cutter comprising:

a means for cutting a stock material into two pieces, comprising a material support means and a moving blade means;

an adjustable aligning means for aligning said cutting means with said stock material at adjustable angles; and a cutter adjustment means for adjusting said material support means linearly, responsive to an adjustment of said adjustable angles, to a position necessary for consistently producing finished cuts in each of said two pieces.

6. The miter cutter of claim 5 further comprising a stop means for presetting said aligning means to a specific alignment position.

7. A steel siding miter cutter capable of smearing galvanized zinc during a cut comprising:

a first pivotal blade;

a first linearly adjustable blade;

a second linearly adjustable blade, said first linearly adjustable blade and said second linearly adjustable blade spaced therebetween by a gap just sufficient to allow said first pivotal blade to pivot therebetween;

a fence for supporting and aligning said steel siding to said cutters, said fence rotatable relative to said first pivotal blade about a first axis;

a structural support for said first pivotal blade, said first and second linearly adjustable blades, and said fence to precisely maintain alignment therebetween;

first and second pins rotatable by said fence, said first and second pins offset from said first axis; and tie rods interconnecting said first and second pins to said first and second linearly adjustable blades for adjustment thereof responsive to a rotation of said fence relative to said first pivotal blade.

8. The steel siding cutter of claim 7 further comprising a stop for adjustably setting the limits of rotation of said fence.

9. The steel siding cutter of claim 7 further comprising a third and a fourth linearly adjustable blade, said third and fourth linearly adjustable blades having means of attachment to said first and said second linearly adjustable blades.

10. The steel siding cutter of claim 7 wherein said first and second pins adjust said first and second linearly adjustable blades by an amount which varies according to the position of said fence relative to said first pivotal blade in a nonlinear function.

11. The steel siding cutter of claim 10 wherein said nonlinear function is comprised by a sine wave function.

12. The sliding miter cutter of claim 1 wherein said automatic blade aligner moves said second cutter blade by an amount which varies as a nonlinear function of a position of said fence relative to said first cutter blade.

13. The sliding miter cutter of claim 12 wherein said nonlinear function is comprised by a sine wave function.

14. The sliding miter cutter of claim 12 wherein said automatic blade aligner comprises a first interconnection joint, offset from an axis of rotation of said fence and displaced through an arc during said rotation of said fence, coupled to linearly displace said second cutter blade.

15. The sliding miter cutter of claim 14 wherein said second cutter blade is displaced by an amount equal to a linear displacement amount of said first interconnection joint parallel to said linear displacement of said second cutter blade.

* * * * *